T. T. CATER.
DENTAL VULCANIZER ATTACHMENT.
APPLICATION FILED JULY 13, 1914.
1,157,759.
Patented Oct. 26, 1915.
2 SHEETS—SHEET 2.
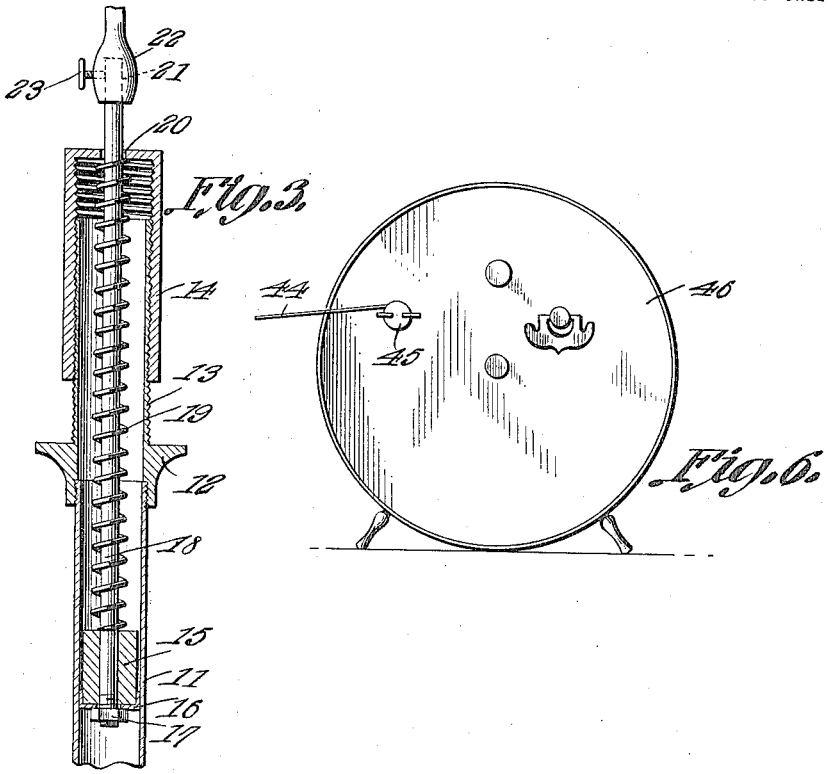
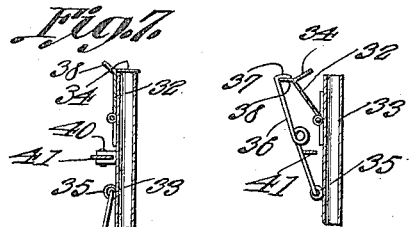
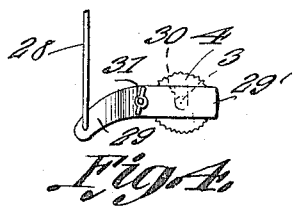
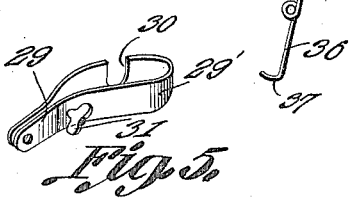
Witnesses
T. T. Cater,
Inventor
by
Attorneys

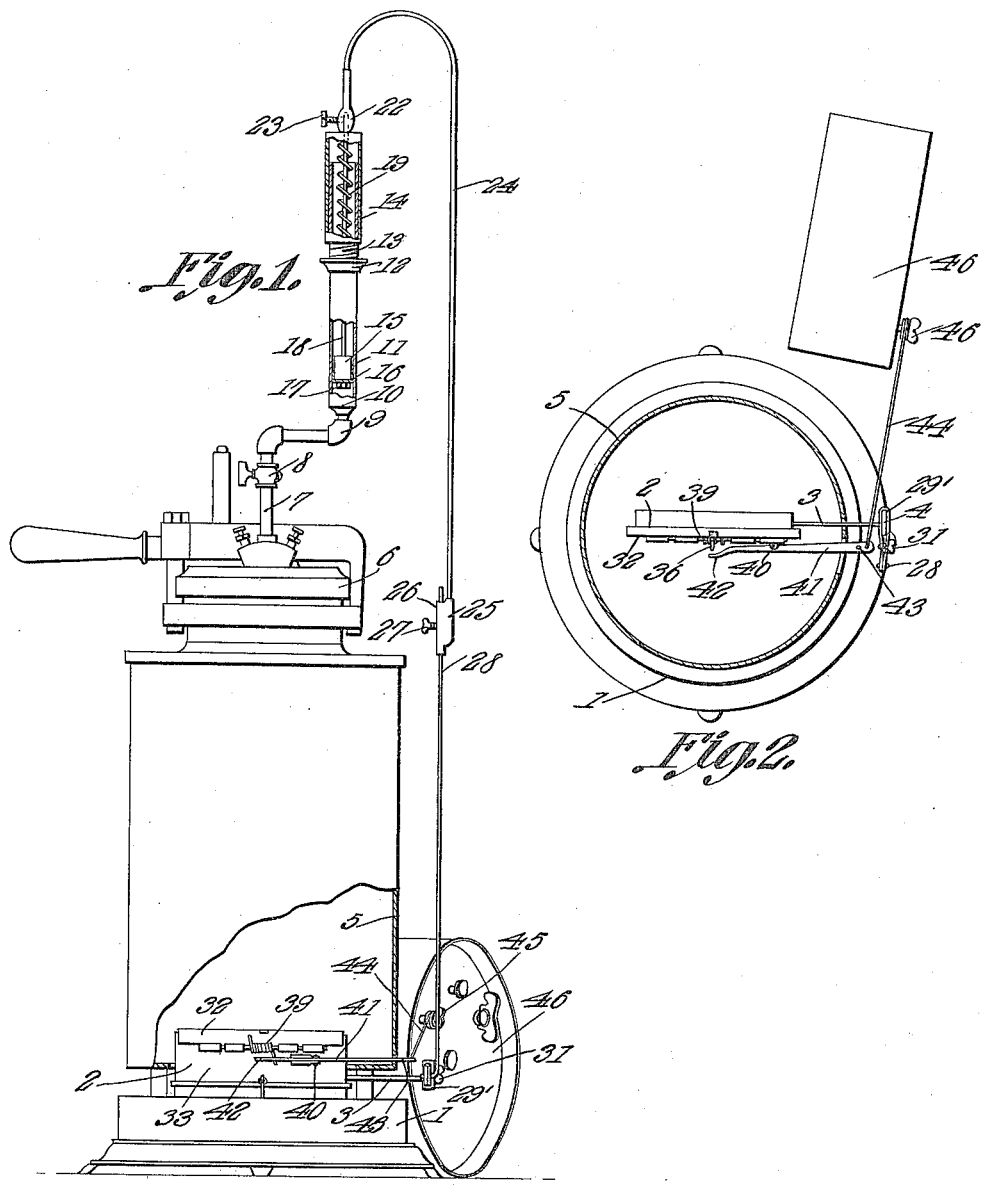

UNITED STATES PATENT OFFICE.

THEODORE T. CATER, OF COLUMBUS, KANSAS.

DENTAL VULCANIZER ATTACHMENT.

1,157,759.     Specification of Letters Patent.    Patented Oct. 26, 1915.

Application filed July 13, 1914. Serial No. 850,785.

*To all whom it may concern:*

Be it known that I, THEODORE T. CATER, a citizen of the United States, residing at Columbus, in the county of Cherokee and State of Kansas, have invented a new and useful Dental Vulcanizer Attachment, of which the following is a specification.

The present invention relates to improvements in dental vulcanizer attachments, one object of the invention being the provision of an attachment for use in connection with an oil burning heating apparatus and a dental vulcanizer, by means of which the steam pressure from the water in the vulcanizer will automatically turn down the wick, while after a predetermined lapse of time in carrying on the vulcanizing process, the flame will be snuffed out.

A further object of the present invention is the provision of a vulcanizing attachment which is readily attached to an oil burning stove and ordinary dental vulcanizer, by means of which a steam actuated mechanical device, readily attached to and detached from the wick adjusting device of the stove, will lower the flame when the pressure of steam has reached a predetermined point, there being further provided a time controlled means for releasing a spring actuated wick snuffer to snuff out the light.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the drawings—Figure 1 is a view partly in section and partly in elevation of an oil heater and dental vulcanizer, with the present invention applied thereto. Fig. 2 is a top plan view of the burner carrying portion of the heater showing the clock controlled snuffing device and also the adjacent portion for turning down the wick. Fig. 3 is an enlarged detail sectional view through the steam actuated valve which is operated by the vulcanizer. Figs. 4 and 5 are enlarged detail views of the wick stem engaging member controlled thereby. Fig. 6 is a rear elevation of an alarm clock showing the method by means of which the snuffing device is operated. Figs. 7 and 8 are enlarged detail sectional views showing the snuffing device for the wick tube in closed and open positions, respectively.

Referring to the drawings, the numeral 1 designates the oil receptacle of the stove which is provided with the usual burner 2 and with the wick controlling stem 3 carrying the milled or knurled operating disk 4. The drum 5 is properly supported upon the oil receptacle 1 and constitutes the supporting means through which heat is transmitted to the dental vulcanizer 6 provided with the venting outlet 7 for the boiling water therewithin. Connected in the venting outlet 7 is the manually controlled valve 8 so that communication may be controlled through the pipe or tube 7 to the coupling 9.

Connected in the coupling 9 is the reduced nipple 10 of the plunger carrying cylinder 11, said cylinder 11 having attached at its upper end, the flaring limiting member 12 which is further provided with the exteriorly screw threaded sleeve 13 for receiving the inverted interiorly screw threaded cup member 14 which is apertured through its closed end concentrically thereof, the purpose of which will presently appear.

Mounted for reciprocation within the casing 11 is the plunger 15 which is connected by means of the cupped packing disk 16 and the nut 17 to the lower end of the plunger rod or stem 18, said stem 18 being projected upwardly and through the opening of the inverted cup 14 and having disposed thereon the spring 19 which normally holds the plunger downwardly and against the pressure arising within the vulcanizer 6 due to the heating of the water therewithin. The upper end of the stem 18 where it projects through the opening 20 of the inverted cup 14, is disposed within the socket 21 of the head 22, the same being attached thereto by means of the set screw 23. A rod 24 which has its upper end curved and connected to the head 22 is provided upon its lowermost terminal with the coupling member 25 which is fast thereto, the same being provided with the sleeve 26 and with the set screw 27, so that the rod 28 may be adjustably attached in the sleeve 26, the lower end of the rod 28 being attached to the terminal 29 of the clamp 29′, as clearly shown in Figs. 3 and 4 so that when the recess 30 fits upon the stem 3 with the disk 4 within the clamp, the screw 31 may be manipulated to grip the same upon the disk 4. By this means when the steam pressure within the cylinder 11 elevates the plunger 15, the rods 24 and 25 will be elevated and consequently actuate the clamp 29', so as to impart rotation to the disk 4 and stem 3, such rotating movement operating to lower the wick of the burner 2 and consequently lower the flame thereof. This mechanism is operated entirely by the steam pressure generated by the water boiling within the vulcanizer 6, but in order to provide a means whereby the flame of the burner may be snuffed out after a predetermined lapse of time, such time being governed according to the time required for vulcanizing, the pivoted plate 32 is connected to the wick tube 33 at one side thereof, so that the portion 34 thereof may be disposed above the tube to snuff out the flame carried by the wick after the same has been turned down a certain distance by means of the before mentioned mechanism.

Pivoted at 35 to the wick tube is a spring catch device 36, whose hooked end 37 is disposed to engage the lip 38 of the snuffer 32, to maintain the same in "set" position, as clearly illustrated in Fig. 8, the position assumed in Fig. 7 being the snuffing position when the snuffer 32 has been released to the action of its spring 39, as clearly illustrated in Fig. 1. Pivoted to the burner tube, at 40, is the lever 41, whose reduced end 42 is disposed to be placed in engagement with the catch or locking device 36 while its other end 43 is connected by means of the flexible connection or cord 44 to the alarm stem 45 of the alarm clock 46.

From the foregoing description, it will be seen that when the present apparatus is set in operation, that the clock will be set for operating the snuffing device 36 at the end of a predetermined time period, while the piston 15 will actuate the wick stem through the clamping device 29 when the steam pressure within the vulcanizer 6 has reached a predetermined pressure, this mechanism merely turning down the wick so as to decrease the heat from the flame thereof, while when the alarm mechanism is released from the clock, the cable or connection 43 will be wound upon the stem or arbor 44 and thus operate the lever 41 to disengage the catch 36 from the snuffer 32, releasing the snuffer to the action of the spring 39 so that the same will be moved from the position shown in Fig. 8 to that shown in Fig. 7, thus snuffing out the flame so that no heat can be generated therefrom.

Although the present invention is shown and described as applied to an oil burning heater, it is evident that the same can be applied to a gas stove or heater with effect.

What is claimed is:

Time controlled flame extinguishing apparatus for oil burning heaters, including a wick tube, a plate hingedly connected thereto and having a snuffing portion extending therefrom and adapted to lap the end of the tube, a lip upon said plate, a spring catch pivotally connected to the tube and adapted to engage the lip to hold the snuffing portion away from the tube, a lever engaging the catch, and time controlled means for actuating the lever to disengage the catch from the lip and release the plate, said plate being movable, when released, to snuffing position, and a spring for shifting said plate to snuffing position, when released.

In testimony that I claim the foregoing as my own, I have hereto affixed my signature in the presence of two witnesses.

THEODORE T. CATER.

Witnesses:
 E. M. TRACEWELL,
 W. J. MOORE.